United States Patent
Crawford et al.

[11] Patent Number: 5,839,556
[45] Date of Patent: Nov. 24, 1998

[54] CONNECTING MECHANISM AND METHOD FOR CONNECTING TRANSMISSION COMPONENTS OF AN OFF-THE-ROAD VEHICLE

[75] Inventors: Paul Alexander Crawford; Douglas Frederick Edwards, both of Medina, Ohio

[73] Assignee: MTD Products Inc, Cleveland, Ohio

[21] Appl. No.: 791,193

[22] Filed: Jan. 31, 1997

[51] Int. Cl.[6] .............................. F16D 11/14; F16D 21/00
[52] U.S. Cl. .................................. 192/48.91; 192/69.62; 192/69.7; 192/69.71
[58] Field of Search ................................ 192/53.51, 53.5, 192/69.62, 69.61, 69.6, 69.71, 69.7, 48.91

[56] References Cited

U.S. PATENT DOCUMENTS

| | | | |
|---|---|---|---|
| 212,336 | 2/1879 | Weston | 192/69.61 |
| 322,423 | 7/1885 | Corey | 192/69.61 X |
| 1,418,338 | 6/1922 | Stone . | |
| 1,647,879 | 11/1927 | Miller | 192/69.62 X |
| 1,834,037 | 12/1931 | Summers . | |
| 1,865,022 | 6/1932 | Larson | 192/69.62 X |
| 2,306,063 | 12/1942 | Koenig . | |
| 2,486,715 | 11/1949 | Koster . | |
| 2,551,922 | 5/1951 | Aveta . | |
| 2,677,967 | 5/1954 | Galbraith | 192/69.62 X |
| 3,105,394 | 10/1963 | Salzmann . | |
| 3,385,407 | 5/1968 | Kleinhans et al. | 192/53.51 |
| 4,019,586 | 4/1977 | Hauser | 192/53.51 X |
| 4,117,652 | 10/1978 | Jones et al. | 192/69.62 X |
| 4,238,012 | 12/1980 | Takiguchi et al. . | |
| 4,271,943 | 6/1981 | Kuzma . | |
| 4,555,003 | 11/1985 | Phillips | 192/53.51 |
| 5,613,321 | 3/1997 | Rizkovsky | 192/69.61 X |

*Primary Examiner*—Rodney H. Bonck
*Attorney, Agent, or Firm*—Emerson & Associates; Roger D. Emerson; Timothy D. Bennett

[57] ABSTRACT

A connecting mechanism for selectively connecting transmission components has a gear with teeth and a clutch collar mechanism. The clutch collar mechanism has a clutch collar, pins, springs used to bias the pins, and spring plates. To connect the clutch collar to the gear, the clutch collar is sliden along its shaft until its pins contact the teeth of the gear. The pins are then pushed back against the springs located within the clutch collar. The clutch collar is then rotated until the pins line up with gaps between the teeth of the gear. The pins are then automatically inserted into the gaps by the springs.

5 Claims, 6 Drawing Sheets

CONNECTING MECHANISM AND METHOD FOR CONNECTING TRANSMISSION COMPONENTS OF AN OFF-THE-ROAD VEHICLE

BACKGROUND OF THE INVENTION

1. Field of Invention

This invention pertains to the art of methods and apparatuses for use in vehicle transmissions, and more specifically to methods and apparatuses for use in connecting the transmission components of an off-the-road vehicle.

2. Description of the Related Art

It is well known to provide off-the-road vehicles, such as lawn and garden vehicles, with a transmission for use in transmitting power from the engine to the driving axle and wheels. Such transmissions typically have various components which must be selectively and operatively connected together. These components include shafts, gears, and sprockets. It is common to use shift forks which engage clutch collars in making such connections. The clutch collars, which are known to use connecting pins, are typically moved along a shaft where they connect to a gear or sprocket.

A common problem encountered in the art is that gears or shafts require flanges to enable them to connect with the pins of a clutch collar. For example, U.S. Pat. No. 1,418,338 to Stone discloses shiftable collars with pins that require a sleeve with a flange in order to connect with a gear or shaft. All such sleeves and flanges add undesired extra weight to the transmission.

The present invention provides methods and apparatuses for reducing this problem. The difficulties inherent in the art are therefore overcome in a way which is simple and efficient, while providing better and more advantageous results.

SUMMARY OF THE INVENTION

In accordance with one aspect of the invention there is provided a connecting mechanism for selectively connecting transmission components. The connecting mechanism has a gear with teeth and a clutch collar with spring loaded pins. To connect the clutch collar to the gear, the pins are inserted directly between the teeth of the gear.

In accordance with another aspect of the invention there is provided a clutch collar mechanism for selectively connecting to either of two gears. The clutch collar mechanism has a clutch collar, pins, springs used to bias the pins, and spring plates. To connect the clutch collar to the gears, the pins are inserted directly between the teeth of the gear or within a lightening hole in the gear.

In accordance with another aspect of the invention there is provided a method for selectively operatively connecting a clutch collar to a gear. The clutch collar is sliden along its shaft until its pins contact the gear. The pins are then pushed back against springs located within the clutch collar. The clutch collar is then rotated until the pins line up with the teeth of the gear. Finally, the pins are inserted between the teeth of the gear.

One advantage of the invention is that the clutch collar pins fit directly between the teeth of the corresponding gear. A flange is not required.

Another advantage of the invention is that the pins are spring loaded. This enables the pins to receive a compressive force without damaging the pins. It also enables the pins to automatically engage with an associated gear whenever the pins and gear teeth are aligned.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
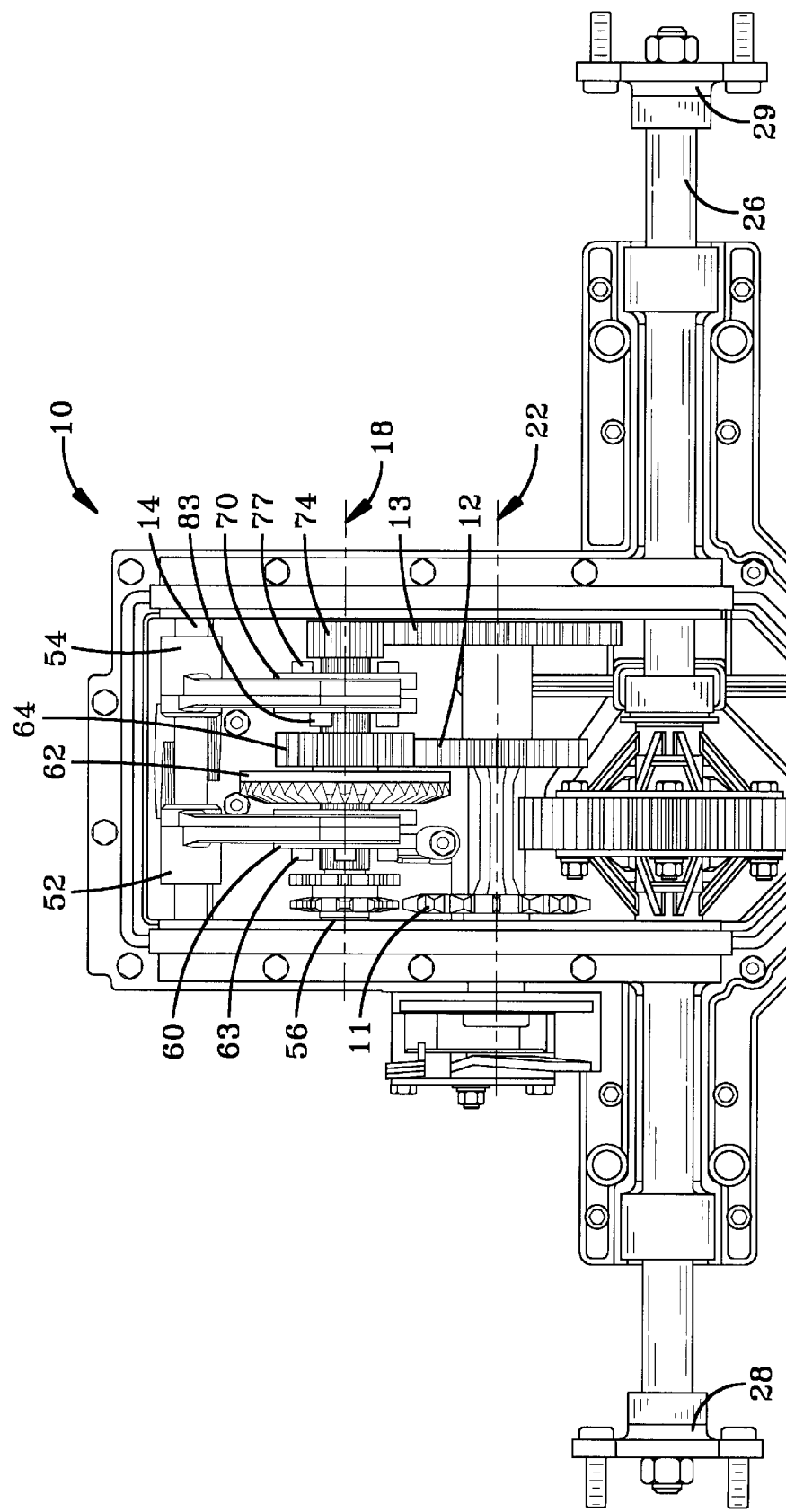
FIG. 1 is top view of a two-speed transmission using the connecting mechanism of this invention.
Figure 2:
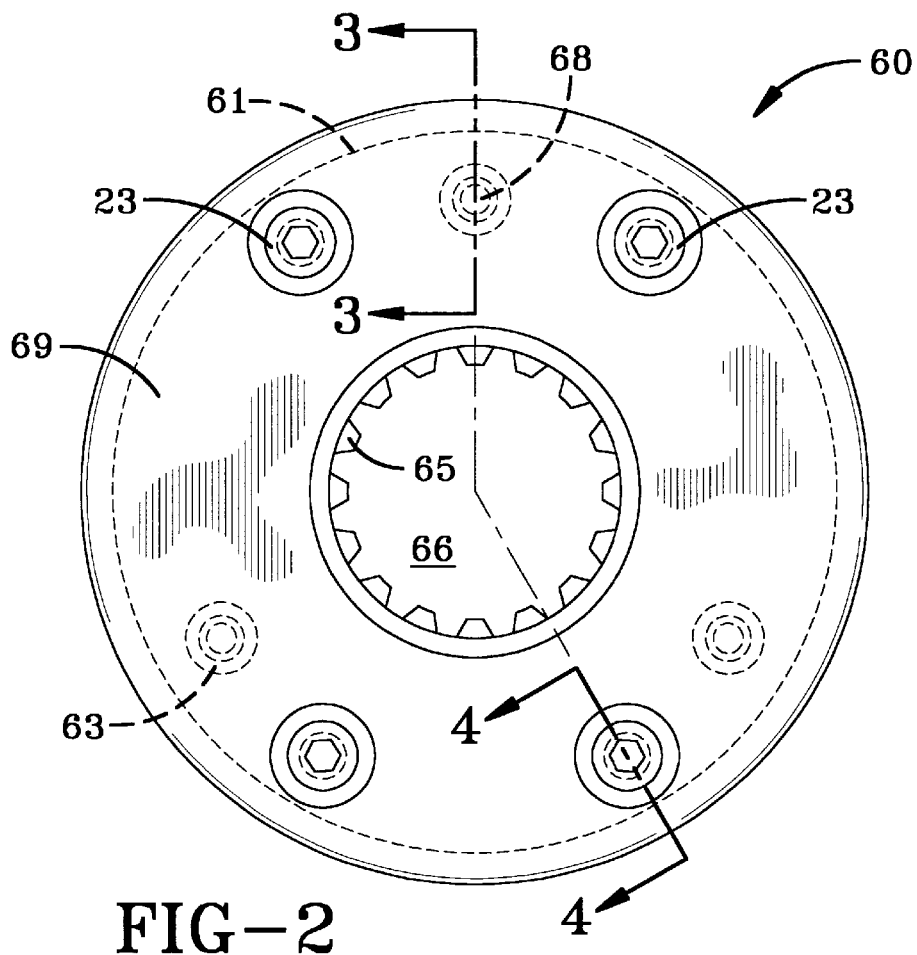
FIG. 2 is a front view of the reverse clutch collar used in this invention.

Referring now to the drawings wherein the showings are for purposes of illustrating a preferred embodiment of the invention only and not for purposes of limiting the same, FIG. 1 shows a transmission 10 which is equipped with the present invention. This embodiment includes a two-speed transmission used on a riding lawn mower but the invention is applicable to other transmissions, other gearing devices, and other applications as well. The transmission 10 includes four shafts altogether, including a shift shaft 14, a drive shaft 18, an output shaft 22, and an driving axle 26 which carries left and right hub assemblies 28, 29 as viewed in FIG. 1. The purpose of the output shaft 22 and the driving axle 26 is as is commonly known in the art so their operation will not be explained further.

With continuing reference to FIG. 1, two connecting mechanisms are used to connect the shift shaft 14 to the drive shaft 18. Rotatably mounted to the shift shaft 14 are left and right shift forks 52, 54 as viewed in FIG. 1.

Rotatably mounted to the drive shaft 18 are sprocket 56, reverse clutch collar 60, bevel gear 62, hi speed gear 64, high-low clutch collar 70 and low speed gear 74. Bevel gear 62 is used to receive input from an input shaft (not shown) as is commonly known in the art so it will not be explained here.

Figure 3:
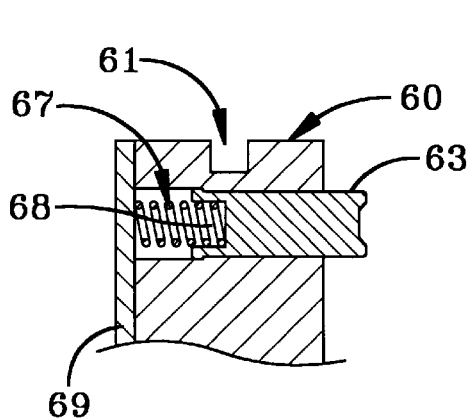
FIG. 3 is a sectional exploded side view taken along the line 3—3 of FIG. 2 showing a pin and a spring within a pin opening in the reverse clutch collar.
Figure 4:
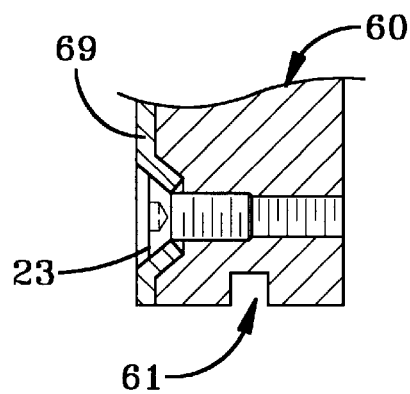
FIG. 4 is a sectional exploded side view taken along the line 4—4 of FIG. 2 showing how the spring plate is attached to the reverse clutch collar.
Figure 5:
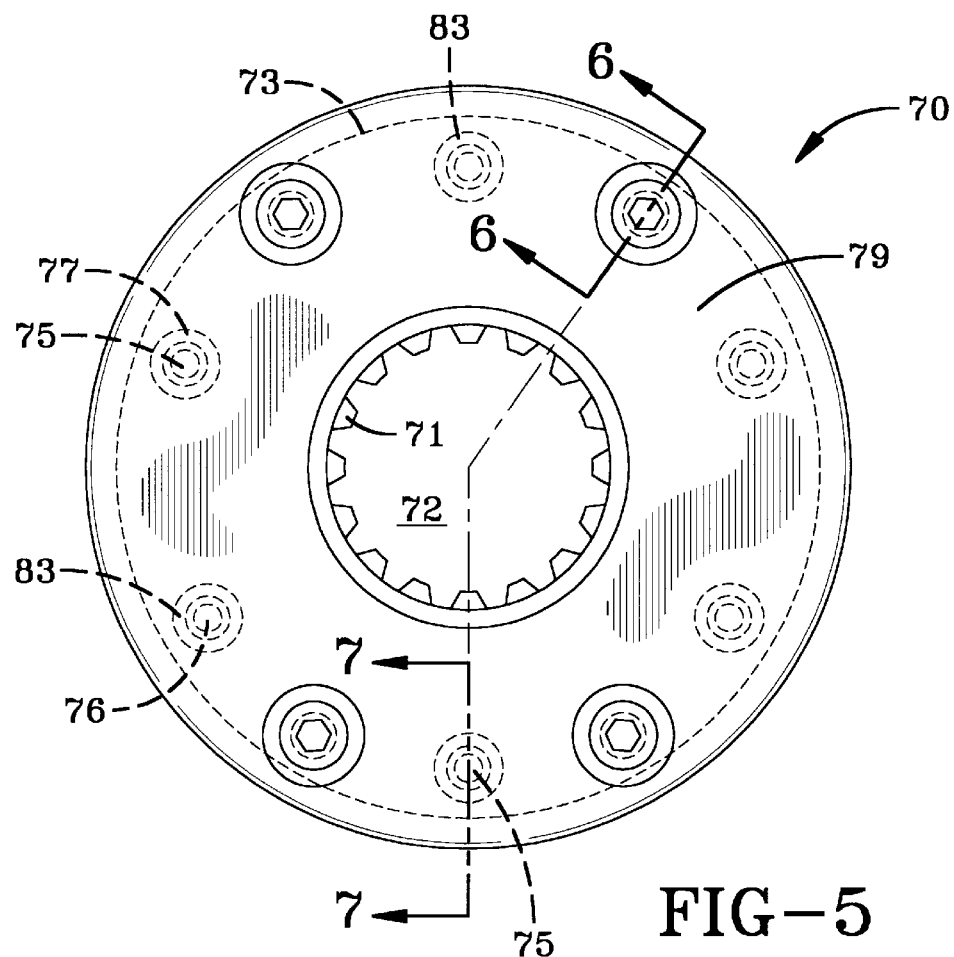
FIG. 5 is a front view of the high-low clutch collar used in this invention.
Figure 6:
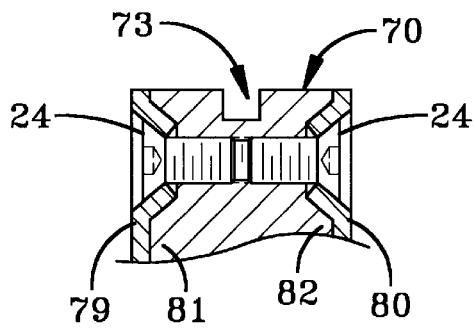
FIG. 6 is a sectional exploded side view taken along the line 6—6 of FIG. 5 showing how the spring plates are attached to the high-low clutch collar.

With reference now to FIGS. 1–4, the reverse clutch collar 60 has a spline 65 around a shaft opening 66 for fitting on the drive shaft 18. The reverse clutch collar 60 also has a channel 61 around its circumference for receiving the left shift fork 52. Three pin openings 68 are arranged equidistantly spaced around the reverse clutch collar 60. Each pin opening 68 contains a pin 63 and a spring 67. As is best seen in FIG. 3, the springs 67 are used to bias the pins 63 in a position extending through the pin openings 68. A spring plate 69 which is attached to the reverse clutch collar 60 by screws 23 is used to hold the springs 67 within the pin openings 68.

Figure 7:
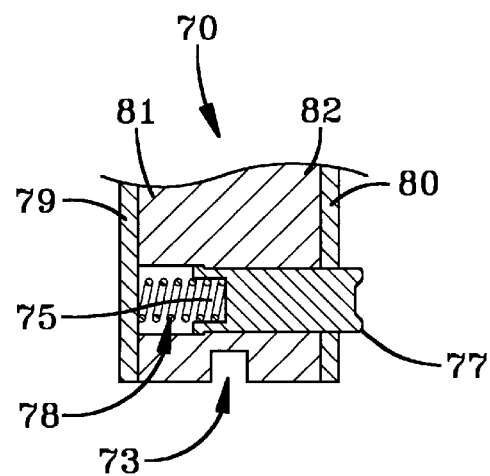
FIG. 7 is a sectional exploded side view taken along the line 7—7 of FIG. 5 showing a pin and a spring within a pin opening in the high-low clutch collar.
Figure 8:
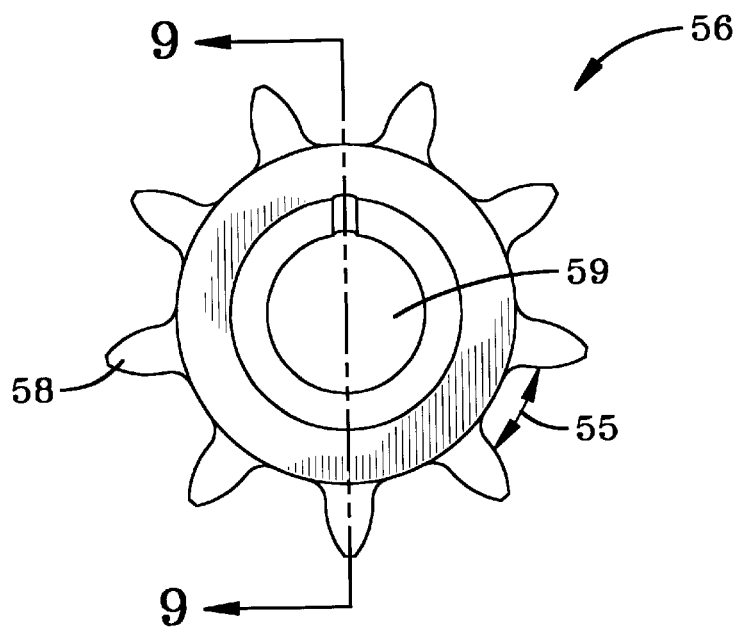
FIG. 8 is a front view of a sprocket used in this invention showing the gaps between the teeth.
Figure 9:
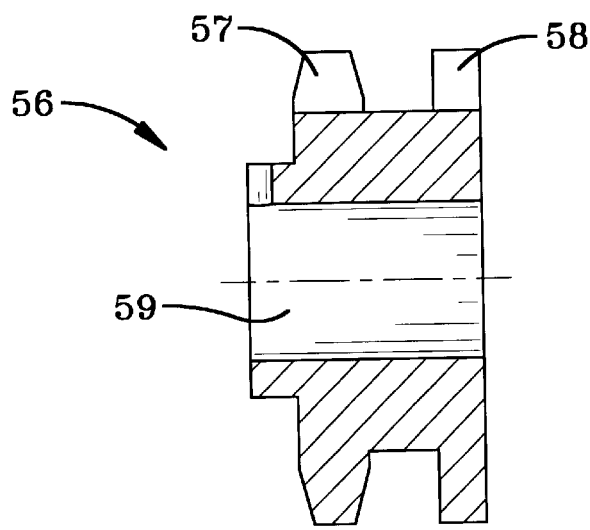
FIG. 9 is a sectional side view of the sprocket taken along the line 9—9 of FIG. 8.
Figure 10:
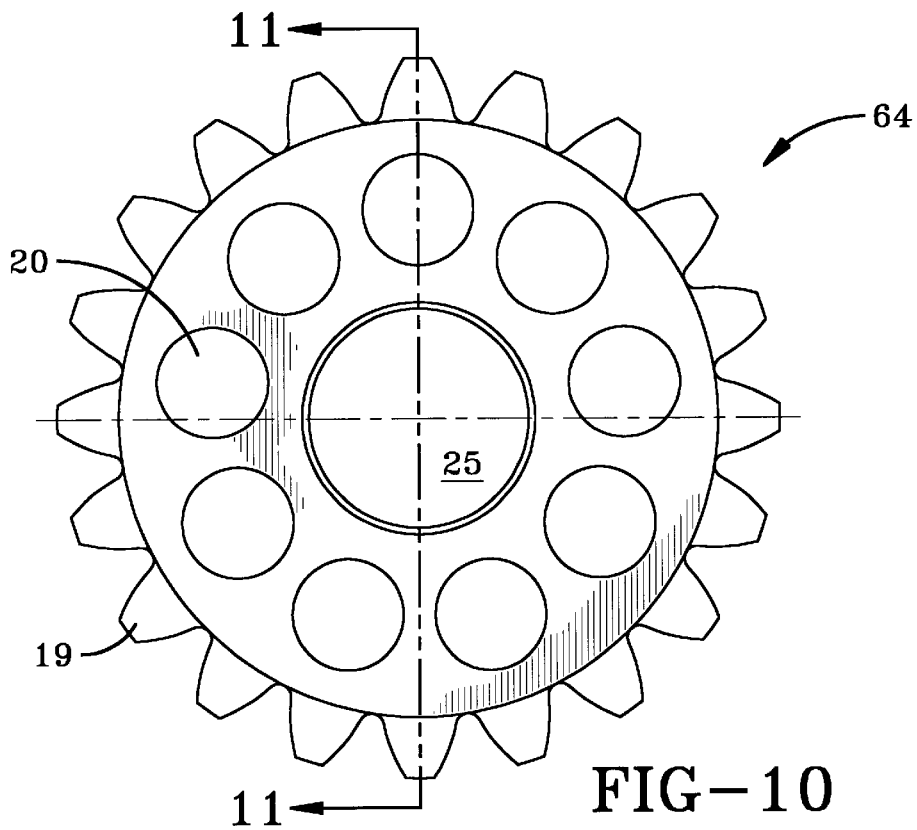
FIG. 10 is a front view of the high speed gear used in this invention showing the lightening holes.
Figure 11:
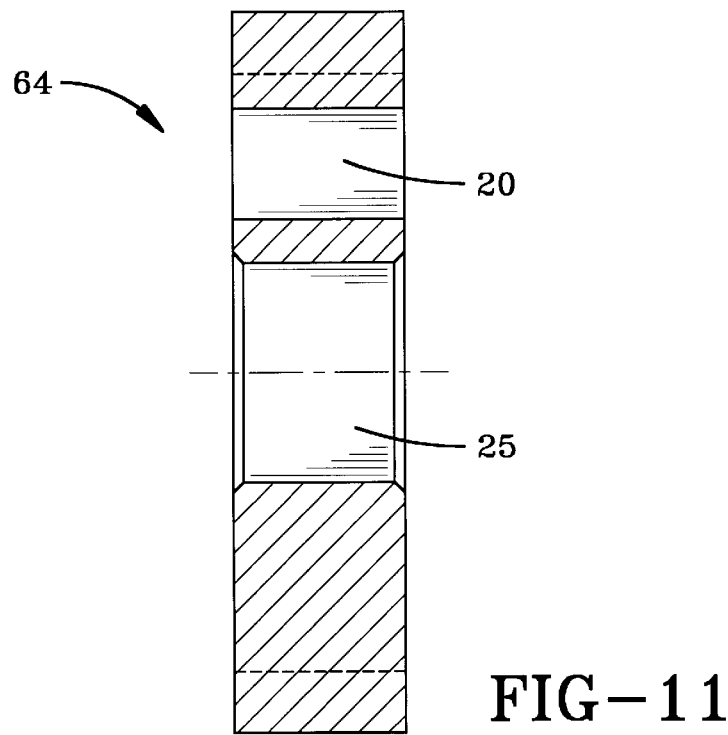
FIG. 11 is a sectional side view of the high speed gear taken along the line 11—11 of FIG. 10.
Figure 12:
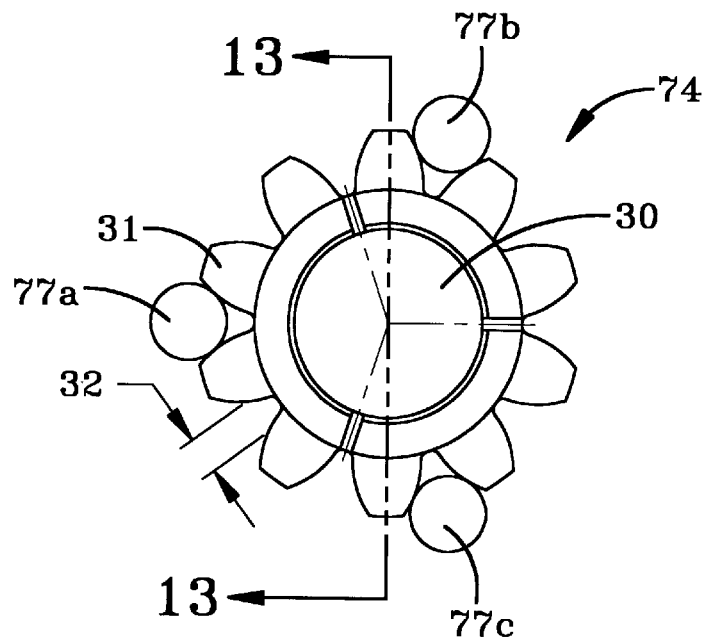
FIG. 12 is a front view of the low speed gear used in this invention showing how the pins of the high-low clutch collar are received within the gaps between the teeth; and, FIG. 13 is a sectional side view of the low speed gear taken along the line 13—13 of FIG. 12 showing the width of the teeth.
Figure 13:
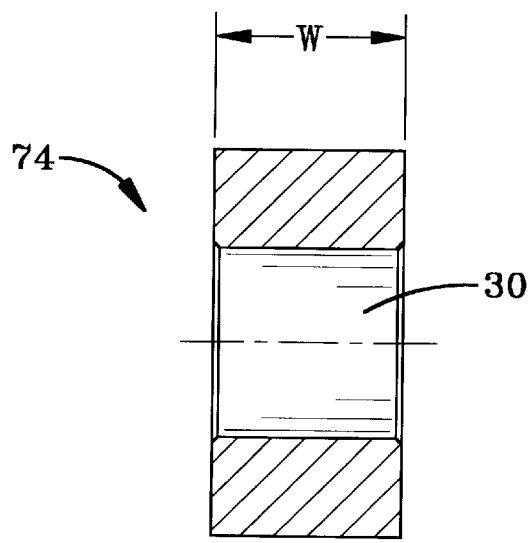

With reference now to FIGS. 1 and 5–7, the high-low clutch collar 70 is designed in a way similar to the reverse clutch collar 60. The high-low clutch collar 70 has first and second sides 81, 82 and a spline 71 around a shaft opening 72 for fitting on the drive shaft 18. The high-low clutch collar 70 also has a channel 73 around its circumference for receiving the right shift fork 54. A first set of three pin openings 75 are arranged in a manner to be discussed below around the high-low clutch collar 70 and they hold a first set of pins 77. A second set of three pin openings 76 are arranged equidistantly spaced around the high-low clutch collar 70 and they hold a second set of pins 83. Each pin opening 75, 76 contains a spring 78. As is best seen in FIG. 7, the springs 78 are used to bias the pins 77, 83 in a position extending through the pin openings 75, 76. The first set of pins 77 are biased to extend toward the second side 82 of the high-low clutch collar 70 and the second set of pins 83 are biased to extend toward the first side 81 of the high-low clutch collar 70. A first spring plate 79 which is attached to the first side 81 of the high-low clutch collar 70 by screws 24 is used to hold the springs 78 within the first set of pin openings 75. Likewise, a second spring plate 80 which is attached to the second side 82 of the high-low clutch collar 70 by screws 24 is used to hold the springs 78 within the second set of pin openings 76.

With reference to FIGS. 1–4 and 8–9, sprocket 56 has a shaft opening 59 for fitting on the drive shaft 18. Sprocket 56 also has first and second sets of teeth 57, 58 axially spaced of each other. The first set of teeth 57 are use to connect sprocket 56 to sprocket 11 by a chain (not shown). The chain can be of any type currently used in the art. The second set of teeth 58 are evenly spaced around the circumference of the sprocket 56 such that a gap 55 is between every two teeth. The evenly spaced gaps 55 are sized such that they can receive any one of the pins 63 on the reverse clutch collar 60. Thus, the reverse clutch collar 60 can be selectively used to rotate sprocket 56.

With reference now to FIGS. 1, 5–7 and 10–11, high speed gear 64 has a shaft opening 25 for fitting on the drive shaft 18. High speed gear 64 also has teeth 19 and evenly spaced lightening holes 20. As is commonly known in the art, the teeth 19 are use to connect high speed gear 64 to gear 12 by intermeshing their teeth. It is also well known in the art to position lightening holes around a gear in order to minimize the weight of the gear. What is advantages about lightening holes 20 is that they not only reduce the weight of high speed gear 64 they also are sized such that they can receive any one of the pins 83 on the high-low clutch collar 70. Thus, the high-low clutch collar 70 can be selectively used to rotate high speed gear 64.

With reference now to FIGS. 1, 5–7 and 12–13, low speed gear 74 has a shaft opening 30 for fitting on the drive shaft 18. Low speed gear 74 also has teeth 31 for connecting to gear 13 by intermeshing teeth as is commonly known in the art. The teeth 31 are evenly spaced around the circumference of the low speed gear 74 such that a gap 32 is between every two teeth. The evenly spaced gaps 32 are sized such that they can receive any one of the pins 77 on the high-low clutch collar 70. Thus, the high-low clutch collar 70 can be selectively used to rotate low speed gear 74. It may be desirable for a gear such as low speed gear 74 to have a number of teeth 31 not evenly divisible by three. Ten teeth 31 are used in this preferred embodiment. When this is the case, the pins 77 cannot be arranged equidistantly spaced around high-low clutch collar 70 because they would not all fit within gaps 32. For this reason pins 77 are arranged as required to be received within gaps 32. In this embodiment as show in FIG. 12, the pins 77 are arranged such that three teeth 31 are between first pin 77a and second pin 77b. Likewise, three teeth 31 are between first pin 77a and third pin 77c. Four teeth 31, however, are between second and third pins 77b and 77c. Of course other arrangements of pins 77 chosen with sound engineering judgment to be received within gaps 32 are also possible for this invention. Note that teeth 31 have a width W sufficiently wide to enable the low speed gear 74 to simultaneously engage gear 13 and the pins 77 of high-low clutch collar 70.

With reference now to FIGS. 1–4 and 8–9, the reverse connecting mechanism operates into reverse as follows. The left shift fork 52 is used to move the reverse clutch collar 60 along drive shaft 18 toward sprocket 56 by means commonly known in the art. As the reverse clutch collar 60 moves, pins 63 come into contact with the teeth 58 of sprocket 56. That contact causes the pins 63 to move inwardly within pin openings 68 compressing springs 67. The reverse clutch collar 60 is then rotated about drive shaft 18. This allows the pins 63 to align with the gaps 55 between the teeth 58 of sprocket 56. When aligned as such, the pins 63 are automatically inserted into the gaps 55 by the springs 67. In this way the reverse clutch collar 60 can be selectively connected to sprocket 36.

With reference now to FIGS. 1, 5–7 and 10–11, the high-low connecting mechanism operates into high gear as follows. The right shift fork 54 is used to move the high-low clutch collar 70 along drive shaft 18 toward high speed gear 64 by means commonly known in the art. As the high-low clutch collar 70 moves, pins 83 come into contact with high speed gear 64. That contact causes the pins 83 to move relatively inwardly within pin openings 76 compressing springs 78. The high-low clutch collar 70 is then rotated about drive shaft 18. This allows the pins 83 to align with the lightening holes 20. When aligned as such, the pins 83 are automatically inserted into the lightening holes 20 by the springs 78. In this way the high-low clutch collar 70 can be selectively connected to high speed gear 64.

With reference now to FIGS. 1, 5–7 and 12–13, the high-low connecting mechanism operates into low gear as follows. The right shift fork 54 is used to move the high-low clutch collar 70 along drive shaft 18 toward low speed gear 74 by means commonly known in the art. As the high-low clutch collar 70 moves, pins 77 come into contact with the teeth 31 of low speed gear 74. That contact causes the pins 77 to move relatively inwardly within pin openings 75 compressing springs 78. The high-low clutch collar 70 is then rotated about drive shaft 18. This allows the pins 77 to align with the gaps 32 between the teeth 31 of low speed gear 74. When aligned as such, the pins 77 are automatically inserted into the gaps 32 by the springs 78. In this way the high-low clutch collar 70 can be selectively connected to low speed gear 74.

In another embodiment of this invention and with reference to FIG. 1, it is not necessary that the clutch collar (whether reverse clutch collar 60, high-low clutch collar 70, or any other clutch collar) be mounted on the same shaft as the gear or sprocket to which it is to be connected. If reverse clutch collar 60, for example, was mounted on a first shaft while sprocket 56 was mounted on a second shaft axially aligned with the first shaft, they could still be selectively connected in the same manner as explained above.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A connecting mechanism comprising:

a first gear having first and second teeth;

a second gear having a first hole;

a clutch collar having first and second sides, said clutch collar also having first and second openings;

a first pin located within said first opening of said clutch collar, said first pin selectively operatively received between said first and second teeth of said first gear; and, a second pin located within said second opening of said clutch collar, said second pin selectively operatively received within said first hole of said second gear.

2. The connecting mechanism of claim 1 wherein said first and second openings extend through said first and second sides of said clutch collar, the connecting mechanism further comprising:

a first spring located within said first opening of said clutch collar, said first spring biasing said first pin in an extended position though said first side of said clutch collar;

a second spring located within said second opening of said clutch collar, said second spring biasing said second pin in an extended position though said second side of said clutch collar;

a first spring plate attached to said second side of said clutch collar, said first spring plate holding said first spring within said first opening of said clutch collar; and, a second spring plate attached to said first side of said clutch collar, said second spring plate holding said second spring within said second opening of said clutch collar.

3. The connecting mechanism of claim 1 wherein said first gear is selectively operatively connected to said clutch collar and a third gear simultaneously.

4. A connecting mechanism comprising:

a sprocket having first and second sets of teeth that are axially spaced, said first set of teeth for selectively connecting to an associated chain, said second set of teeth having first and second teeth;

a clutch collar having first and second sides and a first opening;

a first pin located within said first opening of said clutch collar, said first pin selectively operatively received between said first and second teeth of said second set of teeth of said sprocket.

5. The connecting mechanism of claim 4 wherein said first opening extends through said first and second sides of said clutch collar, the connecting mechanism further comprising:

a first spring located within said first opening of said clutch collar, said first spring biasing said first pin in an extended position though said first side of said clutch collar; and, a first spring plate attached to said second side of said clutch collar, said first spring plate holding said first spring within said first opening of said clutch collar.

* * * * *